(12) United States Patent
Dye

(10) Patent No.: US 10,876,299 B2
(45) Date of Patent: Dec. 29, 2020

(54) FASTENING SYSTEM

(71) Applicant: James Hardie Technology Limited, Dublin (IE)

(72) Inventor: Thayne Dye, Fontana, CA (US)

(73) Assignee: James Hardie Technology Limited, Dublin (IE)

( * ) Notice: Subject to any disclaimer, the term of this patent is extended or adjusted under 35 U.S.C. 154(b) by 165 days.

(21) Appl. No.: 16/076,292

(22) PCT Filed: Mar. 16, 2017

(86) PCT No.: PCT/EP2017/056308
§ 371 (c)(1),
(2) Date: Aug. 7, 2018

(87) PCT Pub. No.: WO2017/158129
PCT Pub. Date: Sep. 21, 2017

(65) Prior Publication Data
US 2020/0173173 A1      Jun. 4, 2020

Related U.S. Application Data

(60) Provisional application No. 62/309,607, filed on Mar. 17, 2016.

(51) Int. Cl.
*E04F 13/12*        (2006.01)
*E04F 13/08*        (2006.01)
(Continued)

(52) U.S. Cl.
CPC .......... *E04F 13/083* (2013.01); *E04F 13/141* (2013.01); *B32B 2607/00* (2013.01);
(Continued)

(58) Field of Classification Search
CPC ..... E04F 13/083; E04F 13/141; E04F 13/007; E04F 13/12; E04F 2203/04; E04F 13/14; E04F 13/0803
See application file for complete search history.

(56) References Cited

U.S. PATENT DOCUMENTS 9,068,358 B2 *   6/2015   MacDonald ......... E04F 13/083
9,976,311 B2 *   5/2018   Gulnick ................ F16M 13/02
(Continued)

FOREIGN PATENT DOCUMENTS

CA         2812108 A1    6/2013
CH          690588 A5   10/2000
(Continued)

OTHER PUBLICATIONS

International Search Report and Written Opinion for corresponding PCT Application No. PCT/EP2017/056308 filed Mar. 16, 2017, dated May 16, 2017, 18 pages.

*Primary Examiner* — Rodney Mintz
(74) *Attorney, Agent, or Firm* — Knobbe Martens Olson & Bear LLP

(57) ABSTRACT

A fastening system suitable for attaching a cladding panel to a structural substrate comprising: a first and second panel support profile member, each of the first and second panel support profile members comprising a first arm, a second arm and a bridging portion intermediate the first and second arm. The bridging portion is configured to be attachable to either a cladding panel or a structural substrate. The first arm of each of the first and second panel support profile members further comprises a projecting member; wherein the configuration of the second arm and at least a portion of the bridging portion of each of the first and second panel support profile member defines a recess; and wherein the first and
(Continued)

second panel support profile members seat together such that the first and second panel support profile members interlock.

26 Claims, 13 Drawing Sheets

(51) Int. Cl.
    *E04F 13/14*     (2006.01)
    *E04F 13/00*     (2006.01)

(52) U.S. Cl.
    CPC ............. *E04F 13/007* (2013.01); *E04F 13/12* (2013.01); *E04F 2203/04* (2013.01)

(56) References Cited

U.S. PATENT DOCUMENTS

| | | | |
|---|---|---|---|
| 2009/0019814 A1 | 1/2009 | Gleeson et al. | |
| 2011/0260129 A1* | 10/2011 | Schopf | E04H 17/168 256/24 |
| 2012/0186170 A1* | 7/2012 | Macdonald | E04F 13/083 52/173.3 |
| 2017/0204615 A1* | 7/2017 | Gulnick | E04F 13/0803 |

FOREIGN PATENT DOCUMENTS

| | | | |
|---|---|---|---|
| WO | WO 2006/039762 A1 | 4/2006 | |
| WO | WO 2008/113136 A1 | 9/2008 | |
| WO | WO-2010149623 A1 * | 12/2010 | ............ E04F 13/083 |
| WO | WO 2017/158129 A9 | 9/2017 | |

\* cited by examiner

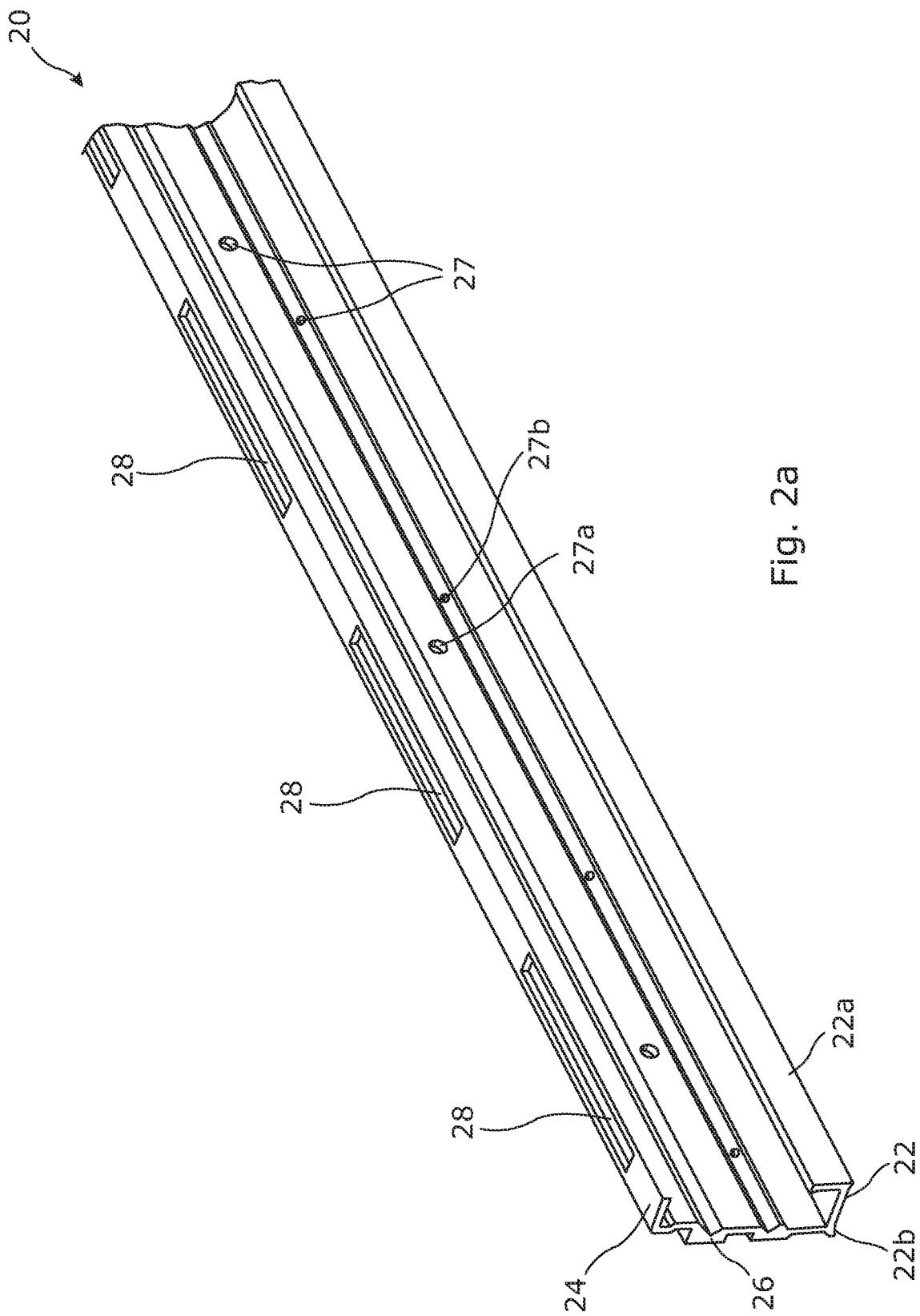

FASTENING SYSTEM

BACKGROUND

Field

Embodiments of the present disclosure relate generally to a fastening system which is suitable for use with cladding systems and in particular exterior cladding systems wherein suitable composite building materials are secured to a building surface or framework using the fastening system to form a building façade.

Description of the Related Art

Cladding systems are widely known in building construction. Generally, cladding or façade panels of various types of materials are fixed to a structural frame, to provide a weather tight exterior envelope on a building. Such panels are conventionally attached to the structural frame by face fixing through the panel using securing means such as nails, screws and the like. However, nails and screws are generally not adequate for fastening heavy panelled products, which typically require highly complex fastening systems that take longer to install and require a high-skill work force to install properly. In addition to installation complexity, the fastening systems for heavy panelled products are expensive to manufacture because they tend to be mechanically complicated in order to meet drainage and structural code requirements.

Accordingly, it is desirable to provide an improved fastening system for use with cladding systems or the like wherein heavy panelled products made of suitable composite building materials can be easily and quickly secured to a building surface or framework using the fastening system to form a building façade.

SUMMARY

In one embodiment, there is provided a fastening system suitable for attaching a cladding panel to a structural substrate comprising:

a first and second panel support profile member, each of the first and second panel support profile members comprising a first arm, a second arm and a bridging portion intermediate the first and second arm, wherein the bridging portion is configured to be attachable to either a cladding panel or a structural substrate;

wherein the first arm of each of the first and second panel support profile members further comprises a projecting member;

wherein the configuration of the second arm and at least a portion of the bridging portion of each of the first and second panel support profile member defines a recess; and wherein the first and second panel support profile members seat together such that the first and second panel support profile members interlock whereby the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member, thereby interlocking the first and second panel support profile members together.

In one embodiment, the first and second panel support profile members are configured to seat together such that the first panel support profile member is inverted relative to the second panel support profile member or vice versa. In this way, the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member, thereby interlocking the first and second panel support profile members together.

Various embodiments of the present disclosure advantageously provide a fastening system that is quick and easy to install for the end user.

In a further embodiment, the first and second panel support profile members are configured to form a rain screen system. This is advantageous for the end user as the fastening system negates the need for additional drainage accessories which reduces the time required to install a cladding system on a structural substrate due to the elimination of a separate rainscreen. This also allows cladding panels to be installed relatively close to the structural substrate which in turn makes it easier to make adjustments when installing windows or the like on the structure being clad.

In one embodiment, the first and second arms of the first and second panel support profile members each comprise at least one drainage opening. In one embodiment, the drainage openings of the first and second arms are positioned on the first and second arms such that the drainage openings of the first and second arms are substantially aligned when the first and second panel support profile members seat together. In one embodiment the substantially aligned drainage openings of the first and second panel support profile members are aligned along at least 50% of the area of the openings, thereby providing a direct fluid flow path through both the first and second panel support profile members. This configuration facilitates drainage and ventilation thereby providing a rain screen system through the fastening system when the first and second panel support profile members seat together.

In a further embodiment, the first and second arms of the first and second panel support profile members further comprises one or more drainage channels. In one embodiment, the one or more drainage channels are in the form of a recess or indentation. In one embodiment the drainage channels are located in the first arm of the first and second panel support profile members. In a further embodiment the drainage channels are located in the first and second arms of the first and second panel support profile members. In a further embodiment, the one or more drainage channels are in communication with the at least one drainage opening. In use, the one or more drainage channels assist in water management through the fastening system when the first and second panel support profile members seat together.

In a further embodiment, the first arm of each of the first and second panel support profile members is configured such that at least a portion of the surface of the first arm is shaped to assist with water management through the fastening system. In one embodiment the at least a portion of the surface of the first is a shaped surface whereby the shape of the surface is configured to promote drainage of water either towards or away from the drainage openings. In one embodiment, the at least a portion of the surface of the first arm is shaped such that the at least a portion of the surface is a sloped, curved or arcuate surface. In such embodiments, the sloped, curved or arcuate surface promotes fluid drainage towards the drainage openings in one orientation. Conveniently, the sloped, curved or arcuate surface of the at least a portion of the surface of the first arm also facilitates drainage away from the drainage openings when in a second orientation. In practice, the at least a portion of the surface of the first arm of the first panel support profile member is orientated such that the at least a portion of the surface of the first arm is in the uppermost position when the first and second panel support profile members are interlocked to facilitate drainage towards the drainage openings and the at least a portion of the surface of the first arm of the second panel support profile member is in the lowermost position when the first and second panel support profile members are interlocked to facilitate drainage away from the drainage openings.

In a further embodiment, the at least a portion of the surface of the first arm configured to assist with water management through the fastening system is coated with a hydrophobic coating to enhance drainage of water either towards or away from the drainage openings depending on the orientation of the first and/or second panel support profile member. The hydrophobic coating alters the surface tension of the surface such that fluid such as water are able to slide over the surface with little to no friction.

In a further embodiment, the first and second panel support profile members are further provided with one or more protuberances. In use, the one or more protuberances also assist in water management through the fastening system when the first and second panel support profile members seat together. In various embodiments, the one or more protuberances advantageously direct water away from a cladding panel and/or structural substrate towards the drainage channels and/or drainage openings when the fastening system is in use.

In one embodiment, the bridging portion of the first and second panel support profile members are provided with one or more fixing apertures. The fixing apertures are configured to enable each of the first and second panel support profile members to attach to either a cladding panel or a structural substrate as desired by the end user. In one embodiment, the fixing apertures are in the form of open ended channels which are shaped to allow placement of a fixing element. In a further embodiment the open ended channels are elongated channels to allow for aging or thermal expansion movements commonly associated with cladding systems.

In one embodiment the fixing apertures are positioned in the bridging portion of the first and second panel support profile members to facilitate the use of angled fasteners. In one embodiment the fixing apertures are set at an angle within a range of approximately 35°±1° to approximately 55°±1°, and more preferably at an angle of approximately 45°±1°. Conveniently a wide range of fasteners or fixing elements can be used to attach the first and second panel support profiles to either a cladding panel or a structural substrate, for example, short or long fiber cement screws, angled pro-twist screws, undercut anchors with or without undercut holes.

In one embodiment, the first and second panel support profile members are identical panel support profile members.

In one embodiment, the first and second panel support profile members are formed from extruded aluminium alloy or folded steel. It is to be understood, that any other suitable material or forming technique known to a person skilled in the art can also be used, for example, the material chosen to form a first and second panel support profile member suitable for attaching a cladding panel to a structural substrate could also be formed from one or more of machined wood, fiberglass, plastic, hardened rubber, metal alloys, carbon fiber, or other similarly hardened woven composites. It is also understood that the forming technique used to form the first and second panel support profile member is selected in accordance with the material chosen to form the first and second panel support profile member, such suitable forming techniques include for example extrusion, mould casting, sheet folding or machining.

In one embodiment, there is provided a cladding system comprising;

at least one cladding panel comprising a front face and a rear face and an edge member intermediate to and contiguous to the front face and the rear face;

a structural substrate; and at least one fastening system wherein, the fastening system comprises a first and second panel support profile member, each of the first and second panel support profile members comprising a first arm, a second arm and a bridging portion intermediate the first and second arm, wherein the bridging portion of the first panel support profile member is configured to be attachable to the rear face of the cladding panel and the bridging portion of the second panel support profile member is configured to be attachable to the structural substrate;

wherein the first arm of each of the first and second panel support profile members further comprises a projecting member;

wherein the configuration of the second arm and at least a portion of the bridging portion of each of the first and second panel support profile member defines a recess; and wherein the first panel support profile member is attached to the rear face of the cladding panel and the second panel support profile member is attached to the structural support; and wherein the first and second panel support profile member seat together such that the first and second panel support profile members interlock whereby the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member, thereby interlocking the first and second panel support profile members together and attaching the cladding panel to the structural substrate.

It is to be understood, that the fastening system is being described with reference to concealed cladding systems, however it is envisaged by the inventor that the fastening system is suitable for use with any object, in particular heavy objects, which require structural supports to secure the objects to a substrate.

Conveniently the cladding panels are mounted such that the front face of the cladding panel forms the exterior component of the cladding system. It is preferable that the fastener or fixing element used to attach the first panel support member to the rear face of the cladding panel does not fully penetrate the cladding panel to ensure that the fastener or fixing element is not visible on the front face of the cladding panel.

In another embodiment the cladding panel comprises a building material comprising cementitious materials, gypsum, or other suitable inorganic building materials such as those containing cellulose, glass, steel or polymeric fibres. In a further embodiment the cladding panel comprises a fiber cement cladding panel.

In a further embodiment, there is provided a method of installing a cladding system on a structural substrate comprising the steps of:
  (a) providing at least one cladding panel comprising a front face and a rear face and an edge member intermediate to and contiguous to the front face and the rear face;
  (b) providing a first and second panel support profile member, each of the first and second panel support profile members comprising a first arm, a second arm and a bridging portion intermediate the first and second arm, wherein the bridging portion of the first panel support profile member is configured to be attachable to the rear face of the at least one cladding panel and the bridging portion of the second panel support profile member is configured to be attachable to the structural substrate; wherein the first arm of each of the first and second panel support profile members comprises a projecting member;
  and wherein the configuration of the second arm and at least a portion of the bridging portion of each of the first and second panel support profile member defines a recess;
  (c) attaching a first panel support profile member to the rear face of the cladding panel;
  (d) attaching a second panel support profile member to the structural substrate; and
  (e) seating the first and second panel support profile members together such that the first and second panel support profile members interlock whereby the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member, thereby interlocking the first and second panel support profile members together and attaching the cladding panel to the structural substrate.

It is to be understood, that steps (c) and (d) of the method, could also be performed in the reverse order, wherein the steps of the method comprise attaching the second panel support profile member to the structural substrate in advance of attaching the first panel support profile member to the rear face of the cladding panel.

In a further embodiment the method further comprises the step of installing weather resistive barrier and/or weather resistant tape and/or flashings to the structural substrate in advance or during the process of installing a cladding system in accordance with steps (a) to (e) as outlined above.

Further aspects or embodiments of the present disclosure will become apparent from the ensuing description which is given by way of example only.

BRIEF DESCRIPTION OF THE DRAWINGS

A preferred embodiment of the present disclosure will now be described, by way of example only, with reference to the accompanying drawings in which:

FIG. 1b is a side view of the profile of FIG. 1a;
FIG. 2a is a perspective view of a section of a second embodiment of a profile of the fastener system;
FIG. 2b is a side view of the profile of FIG. 2a;
FIG. 3b is a side view of the profile of FIG. 3a;
FIG. 4b is a side view of the profile of FIG. 4a;
FIG. 5b is a side view of the façade panel, fastener system and frame structure of FIG. 5a;
FIG. 6b is a side view of the profile of FIG. 6a;
and
FIG. 6c is a side view of a fastener system using two profiles of FIG. 6a, wherein one of the fifth embodiment profile of FIG. 6a is inverted relative to the other of the fifth embodiment profile of FIG. 6a.

DETAILED DESCRIPTION OF THE PREFERRED EMBODIMENT

Figure 1A:
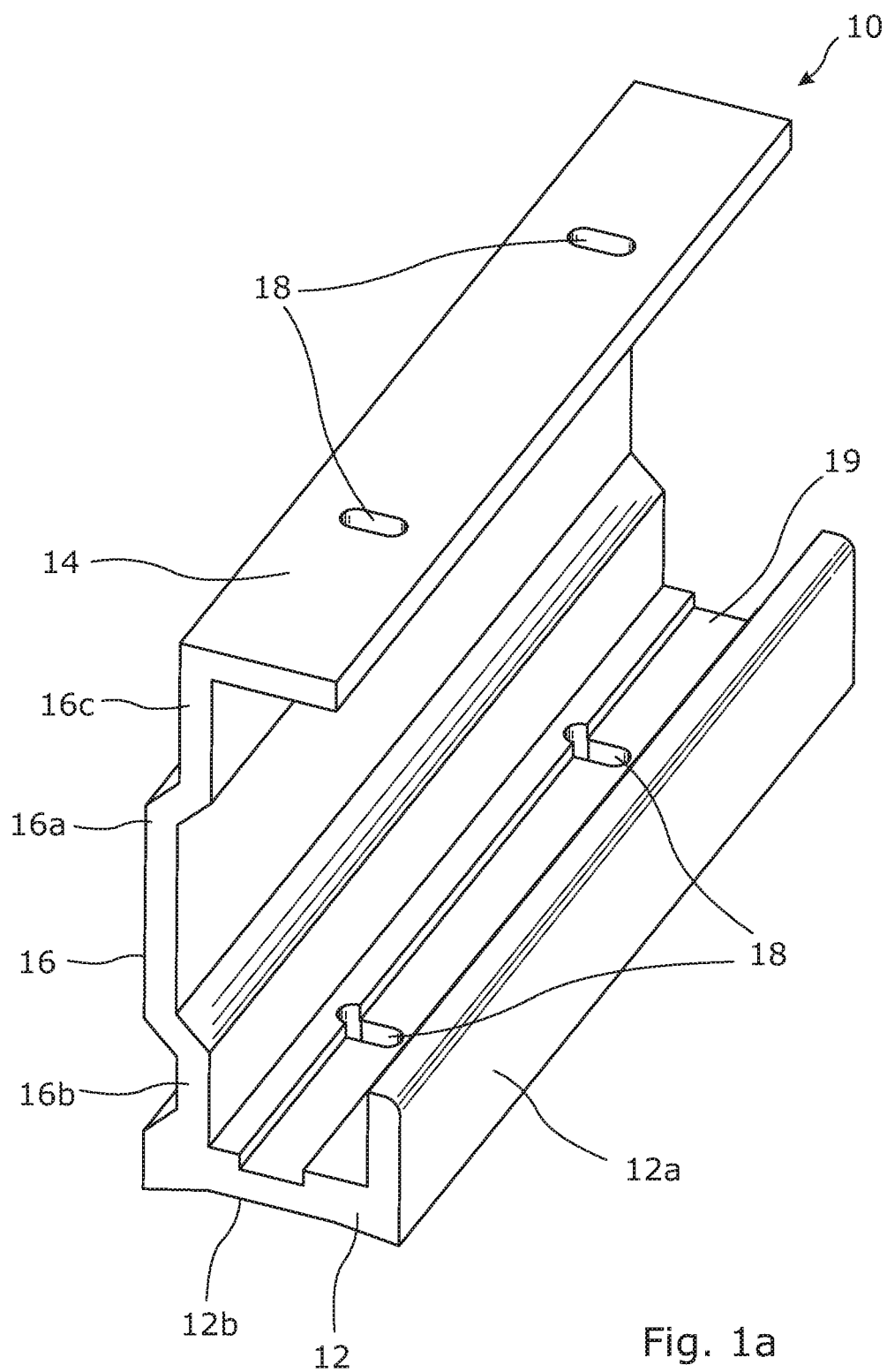
FIG. 1a is a perspective view of a section of a first embodiment of a profile of the fastener system.

References will now be made to the drawings wherein like numerals refer to like parts throughout. In the drawings, a first panel support profile member is shown and described herein. It is to be understood, that in the embodiments shown, two first panel support profile members can be used to form a fastener system described herein. Consequently, it is to be understood that references to the first panel support profile member should where appropriate extend to the second panel support profile member.

Figure 1B:
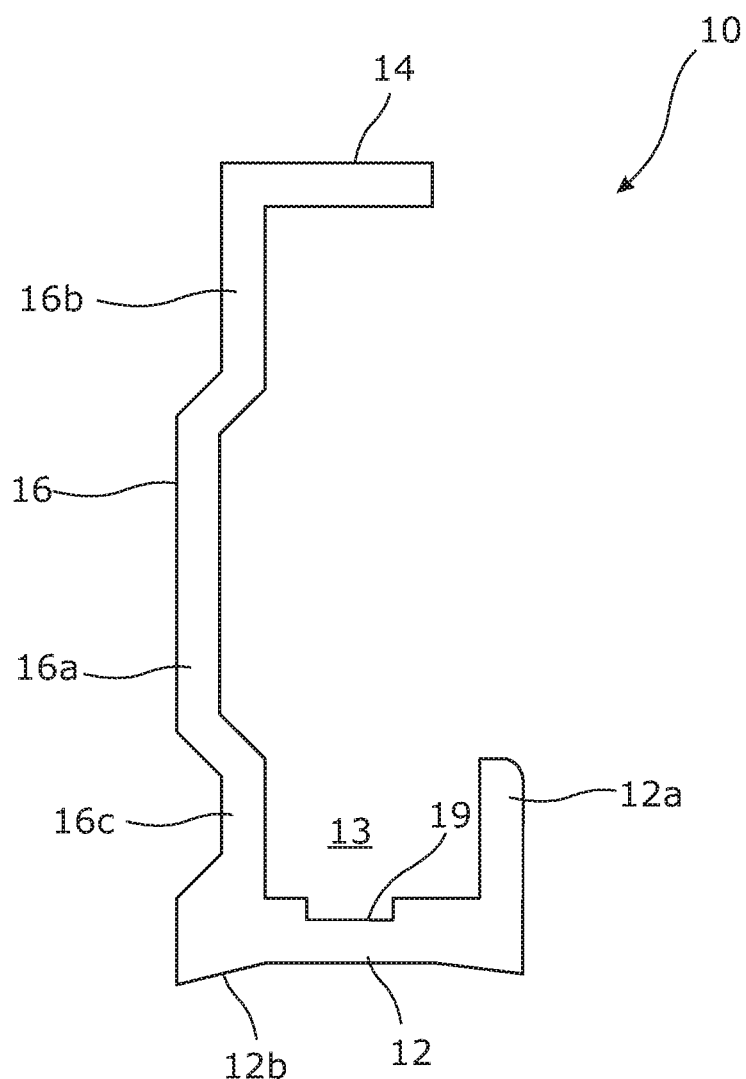

Referring to FIGS. 1a and 1b, there is shown one embodiment of the first panel support profile member 10, comprising a first arm 12, a second arm 14 and a bridging portion 16 intermediate the first and second arm 12, 14.

Bridging portion 16 has a ribbed profile comprising a central rib portion 16a and side sections 16b and 16c respectively on either side of central rib portion 16a. Side sections 16b and 16c are offset from central rib portion 16a. First arm 12 comprises an orthogonal extension from side section 16c remote rib portion 16a, whilst second arm 14 comprises an orthogonal extension from side section 16b remote rib portion 16a. In the embodiment shown, first and second arms 12, 14 extend in the same direction from bridging portion 16 and are substantially in parallel with each other. Second arm 14 extends a shorter distance than first arm 12. First arm 12 further comprises projecting member 12a which extends orthogonally from first arm 12 remote rib portion 16b substantially in parallel with bridging portion 16. The bridging portion 16, first arm 12 and projecting member 12a together form a 'u' shaped receiving channel 13 shaped and sized to accommodate second arm 14.

Side section 16b and second arm 14 are offset from central rib portion 16a to accommodate projecting member 12a of the first arm 12. In the embodiment shown, the distance side section 16b is offset from central rib portion 16a is at least the width or thickness of projecting member 12a. For example, in one embodiment, the distance side section 16b is offset from central rib portion 16a is at least 0.125" (3.18 mm)±0.01" (0.25 mm) and the width of projecting member 12a is approximately 0.125" (3.18 mm)±0.01" (0.25 mm). It is of course understood, that the distance side section 16b is offset from central rib portion 16a is variable and can be set to any appropriate distance to accommodate projecting member 12a of first arm 12 such that projecting member 12a interfaces with side section 16b.

It is also understood that, in some embodiments, the thickness of the first and second panel support profile member is entirely dependent of the material used to form the profile member. In one embodiment, the first and second panel support profile members are formed from extruded aluminium alloy or folded steel, however, it is to be understood, that any other material known to a person skilled in the art can also be used to form a first and second panel support profile member suitable for attaching a cladding panel to a structural substrate.

In a further embodiment, the width or thickness of the material used to form the first and/or second panel support profile member is variable across the profile. For example, in one embodiment, the width of the projecting member 12a is approximately 0.10" (2.54 mm), whilst the width of central rib portion 16a is approximately 0.125" (3.18 mm) and the width of second arm 14 is approximately 0.08" (2.0 mm). In such an embodiment, the distance side section 16b is offset from central rib portion 16a is at least 0.1" (2.54 mm).

In practice, an end user uses two first panel support profile members to form a fastening system, whereby a first panel support profile member is inverted relative to the second panel support profile member such that the first and second panel support profile members seat together. The shape of the first panel support profile member allows two first panel support profile members to interlock. In this instance, second arm 14 seats within 'u' shaped receiving channel 13 and projecting member 12a of the first arm 12 interfaces with side section 16b and second arm 14 such that projecting member 12a is retained by side section 16b and second arm 14. Although not shown, central rib portion 16a comprises at least one fixing aperture, through which the first panel support member 10 is attachable to either a cladding panel or a structural substrate as desired by the end user. When the first panel support profile members are attached to a structural substrate and cladding panel respectively, the weight of the cladding panel forces first and second panel support profile members into position.

The first and second arms 12, 14 each comprise drainage openings 18. Drainage openings 18 can be in the form of an oval shaped apertures or weep holes. In the embodiment shown, first panel support profile member 10 is of non-uniform thickness, whereby first arm 12 is thicker than second arm 14 and bridging portion 16. First arm 12 further comprises a drainage channel 19 in the form of a recess or indentation. Drainage channel 19 is in communication with drainage openings 18 to allow fluid to move to the drainage openings or weep holes 18. External surface 12b of first arm 12 remote from drainage channel 19 is a curved or arcuate surface to facilitate water management whereby the shape of the surface is configured to promote drainage of water either towards the drainage openings 18 or away from the drainage openings 18 depending on the orientation of the first panel support profile member 10. Although not shown, it is possible for surface 12b to be coated with a hydrophobic coating to further promote drainage of water either towards or away from the drainage openings 18 depending on the orientation of the first panel support profile member 10.

Drainage openings 18 of the first and second arms 12, 14 are positioned on the first and second arms 12, 14 such that the drainage openings 18 of the first and second arms 12, 14 are substantially aligned when the first and second panel support profile members 10 seat together. This configuration facilitates drainage and ventilation thereby providing a rain screen system through the fastening system when the first and second panel support profile members 10 seat together.

Figure 2B:
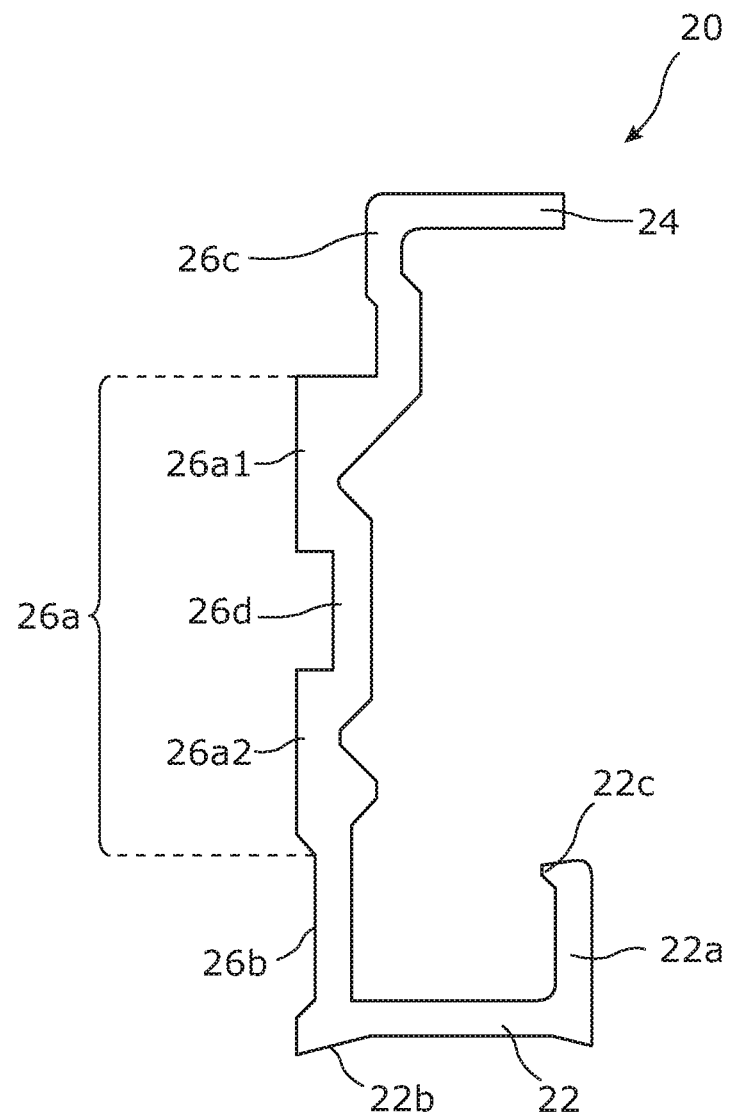

Referring to FIGS. 2a and 2b, there is shown another embodiment of a first panel support profile member 20, comprising a first arm 22, a second arm 24 and a bridging portion 26 intermediate the first and second arm 22, 24. Bridging portion 26 also has a ribbed profile comprising a central portion 26a wherein, central portion 26a comprises a channel 26d, with rib portions 26a1 and 26a2 on either side of the channel 26d. Side sections 26b and 26c respectively are positioned on either side of rib portions 26a1 and 26a2. In this embodiment only side section 26c is offset from central portion 26a. Channel 26d is included in the bridging portion 26 to allow the first panel support profile member 20 to provide grip and mechanical advantage in applying torque to tighten fasteners used to secure the first panel support profile member 20 to either a cladding panel or a structural substrate.

As illustrated in FIG. 2a, the first panel support profile member 20 can be configured as an elongated track designed to couple and interlock with a second elongated track having the same configuration. One of the tracks can be affixed to the back side of a heavy panelled building product, such as a 4 ft.×8 ft. (121.9 cm×243.8 cm) cladding panel. The other one of the tracks can be affixed to a building frame. The fastening system according to some embodiments can comprise more than one pair of the elongated tracks arranged in a spaced apart relationship between the cladding panel and the building frame. The tracks facilitate alignment of the cladding panel to the building frame and allow a large, heavy cladding panel to be easily and quickly attached to the building frame. The tracks are also designed to be self-locking in that the weight of the cladding panel automatically locks the track on the back side to the track on the building frame. Furthermore, the tracks are designed to be positioned in a manner such that they are concealed from view and do not detract from the aesthetics of the cladding panel.

In some embodiments, each track can have non-uniform wall thickness, such as varying between 0.08" and 0.25" (2.0 mm and 6.35 mm). The varying wall thickness provides a lightweight track and yet with sufficient strength and stiffness to support the heavy cladding panel. In addition, the tracks together form a rain screen and water drainage system between the building frame and cladding panel. In one embodiment, each pair of tracks when interlocked has water drainage openings 28 formed on the top and bottom sides to permit water to flow through. In addition, the top and bottom sides of the tracks when coupled together are configured with sloped or concave surfaces 22b so as to facilitate water on the top side to flow down through the openings and to direct water creeping upward on the bottom surface via capillary action to flow into the drainage opening.

In this embodiment, two types of fixing apertures 27 are shown on bridging portion 26. Fixing apertures 27a are linear apertures and fixing apertures 27b are angled apertures wherein the angled apertures are set at an angle within a range of approximately 35°±1° to approximately 55°±1°, and more preferably at an angle of approximately 45°±1°. Conveniently a wide range of fasteners or fixing elements can be used to attach the first and second panel support profiles to either a cladding panel or a structural substrate.

As before, first arm 22 comprises an orthogonal extension from side section 26c, whilst second arm 24 comprises an orthogonal extension from side section 26b wherein first and second arms 22, 24 extend in the same direction from bridging portion 26 and are substantially in parallel with each other. Projecting member 22a which extends orthogonally from first arm 22 remote from bridging portion 26 further comprises a detent 22c. Detent 22c is positioned on projecting member 22a to provide a resilient bias when first panel support profile member is seated together with a second panel support profile member.

In this embodiment, drainage openings 28 comprise an elongate narrow aperture or slot 28. One of the advantages of this particular configuration is that slots 28 provide an alignment tolerance when the first and second panel support profile members 20 seat together. This configuration also facilitates drainage and ventilation thereby providing a rain screen system through the fastening system when the first and second panel support profile members 20 seat together.

Figure 3A:
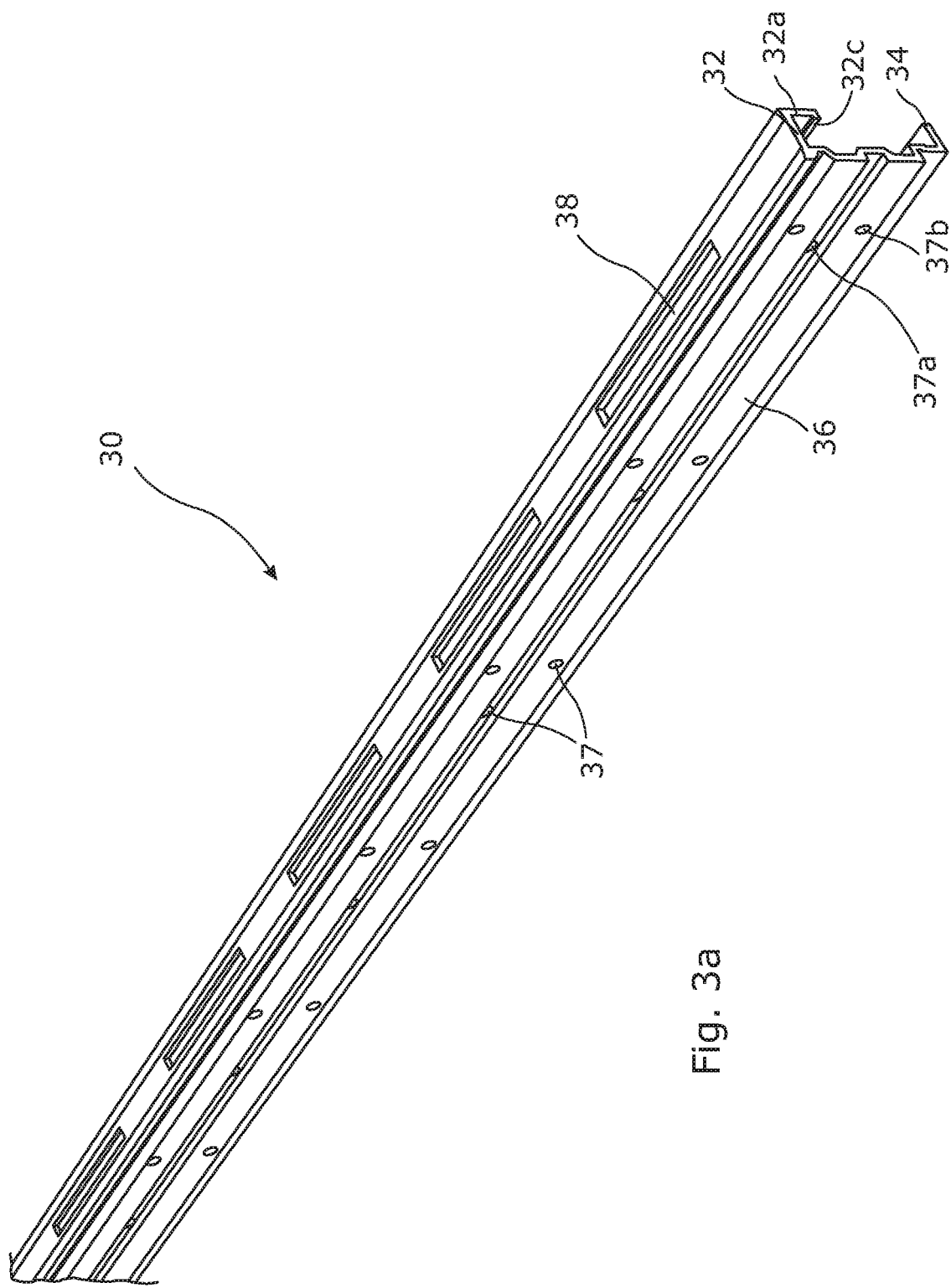
FIG. 3a is a perspective view of a section of a third embodiment of a profile of the fastener system.
Figure 3B:
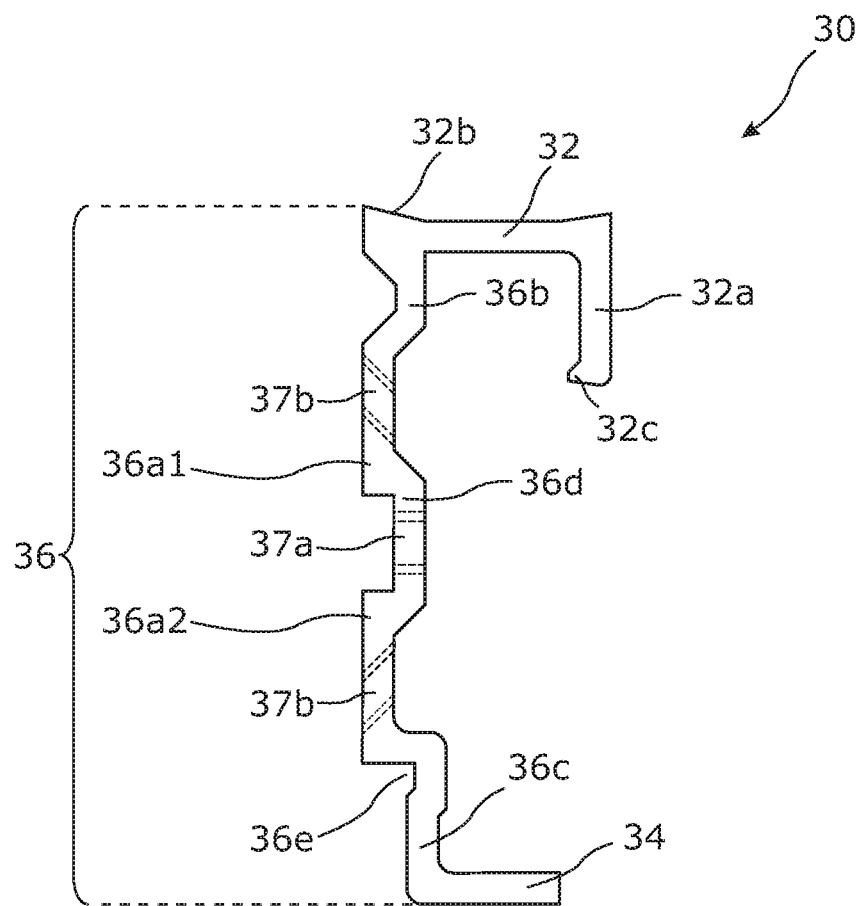

Referring now to FIGS. 3a and 3b, there is shown a further embodiment of a first panel support profile member 30, comprising a first arm 32, a second arm 34 and a bridging portion 36 intermediate the first and second arm 32, 34.

Bridging portion 36 again has a ribbed profile comprising a central portion wherein, the central portion comprises a channel 36d, with rib portions 36a1 and 36a2 on either side of the channel 36d. Side sections 36b and 36c respectively are positioned on either side of rib portions 36a1 and 36a2. Channel 36d is again included in the bridging portion 36 to allow the first panel support profile member 30 to provide grip and mechanical advantage in applying torque to tighten fasteners which are used to secure the first panel support profile member 30 to either a cladding panel or a structural substrate.

In this embodiment, first panel support profile member 30 further comprises connecting means to securely seat two first panel support profile member 30 together. Projecting member 32a comprises a ridge 32c, whilst side section 36c comprises a recess or groove 36e. In use, the first panel support profile member 30 is inverted relative to the other first panel support profile member 30 and the two first panel support profile members 30 seat together such that projecting member 32a inserts into recess 36e, forming a tongue and groove type joint between the two first panel support profile members 30.

External surface 32b of first arm 32 is a sloped, curved or arcuate surface to facilitate water management whereby the shape of the surface is configured to promote drainage of water either towards the drainage openings 28 or away from the drainage openings 28 depending on the orientation of the first panel support profile member 30.

As for previous embodiments, fixing apertures 37 are positioned on bridging portion 36. Fixing apertures 37a are linear apertures and fixing apertures 37b are angled apertures wherein the angled apertures are set at an angle within a range of approximately 35°±1° to approximately 55°±1°, and more preferably at an angle of approximately 45°±1°. Conveniently a wide range of fasteners or fixing elements can be used to attach the first and second panel support profiles to either a cladding panel or a structural substrate.

Figure 4A:
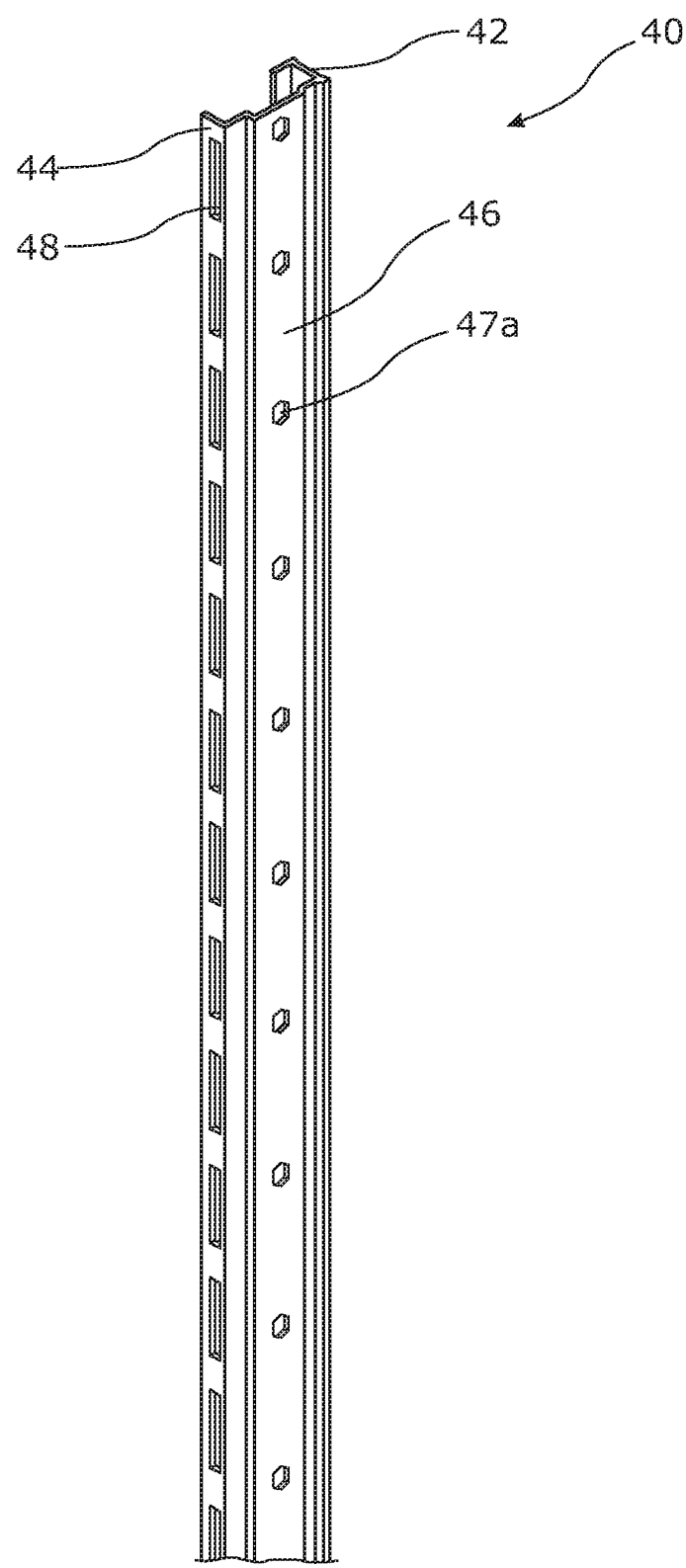
FIG. 4a is a perspective view of a section of a fourth embodiment of a profile of the fastener system.
Figure 4B:
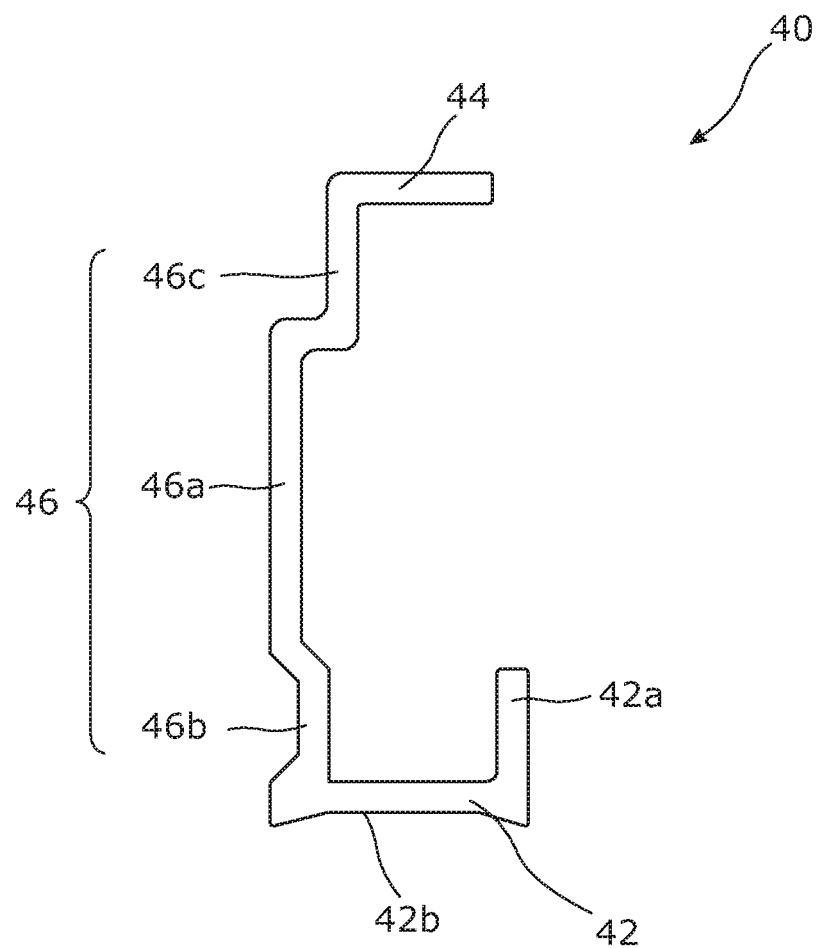

Referring now to FIGS. 4a and 4b, there is shown a further embodiment of a first panel support profile member 40, comprising a first arm 42, a second arm 44 and a bridging portion 46 intermediate the first and second arm 42, 44.

In this embodiment, bridging portion 46 again has a ribbed profile comprising a central portion 46a and side sections, 46b and 46c respectively, positioned on either side of central portion 46a. Side sections 46b and 46c are offset from central portion 46a. The distance side section 46c is offset from central portion 46a is greater than the width of projecting member 42a. The advantage of this is that provides a degree of tolerance which makes it easier for an end user to seat two first panel support profile members together such that projecting member 42a interfaces with side section 46c.

As for previous embodiments, fixing apertures 47 are positioned on bridging portion 36. In this embodiment, fixing apertures 47a are configured to seat a nut or fasteners comprising a polygon shape. In some instances, fixing aperture 47a, comprises an elongate polygonic shape, wherein at least one pair of opposing sides of the polygonic shape are longer than the other sides of the polygonic shape to allow lateral movement of a fastener within the fixing aperture 47a. In most instances, nuts or fasteners comprise a hexagonal shape, thus in this instance, the fixing aperture 47a comprises a hexagonal open ended channel or an elongate hexagonal open ended channel, however it is to be understood that any polygonic shaped aperture or elongate polygonic shaped aperture suitable to seat a nut or fastener can also be used. One of the advantages of using this shaped fixing aperture is that an end user is able to drill holes for the fasteners or fixing elements easily without needing to lift or move the first panel support profile member. A further advantage of elongate apertures 47a is that the size and shape of the apertures allows for ageing, thermal expansion or other movements commonly associated with cladding systems.

Figure 6A:
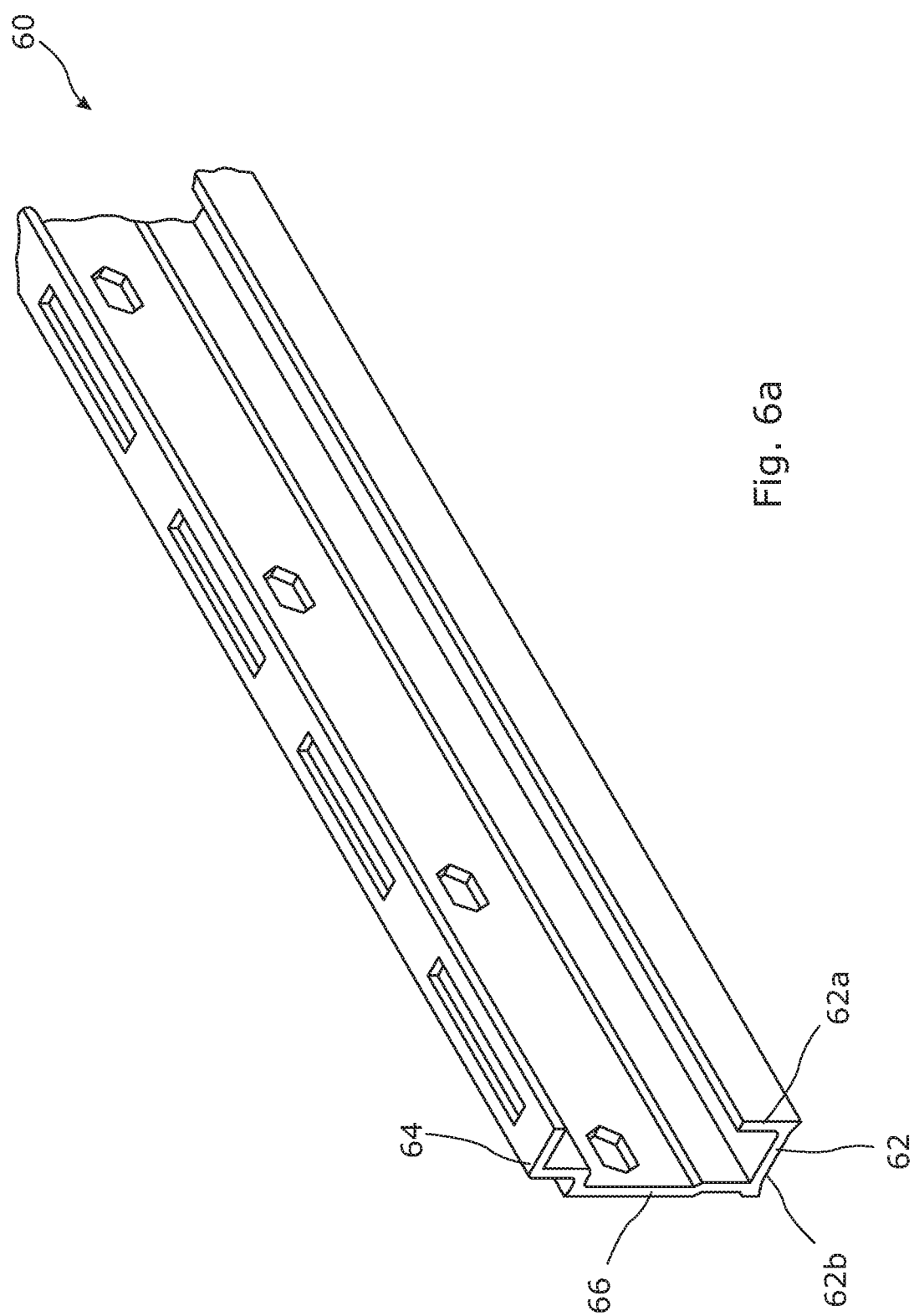
FIG. 6a is a perspective view of a section of a fifth embodiment of a profile of the fastener system.
Figure 6B:
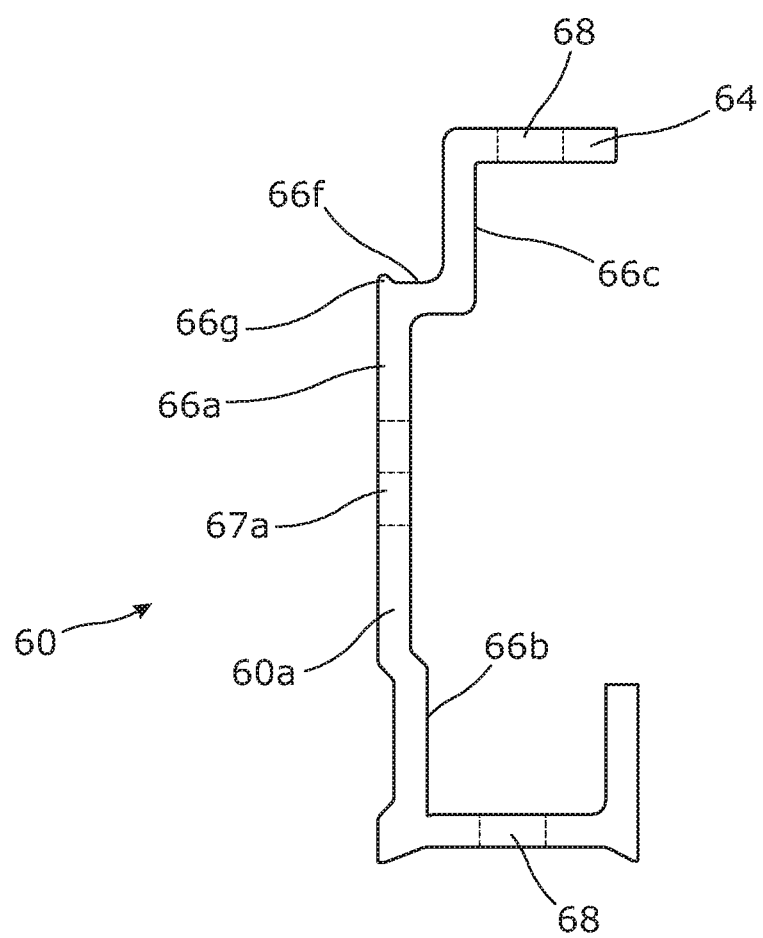
Figure 6C:
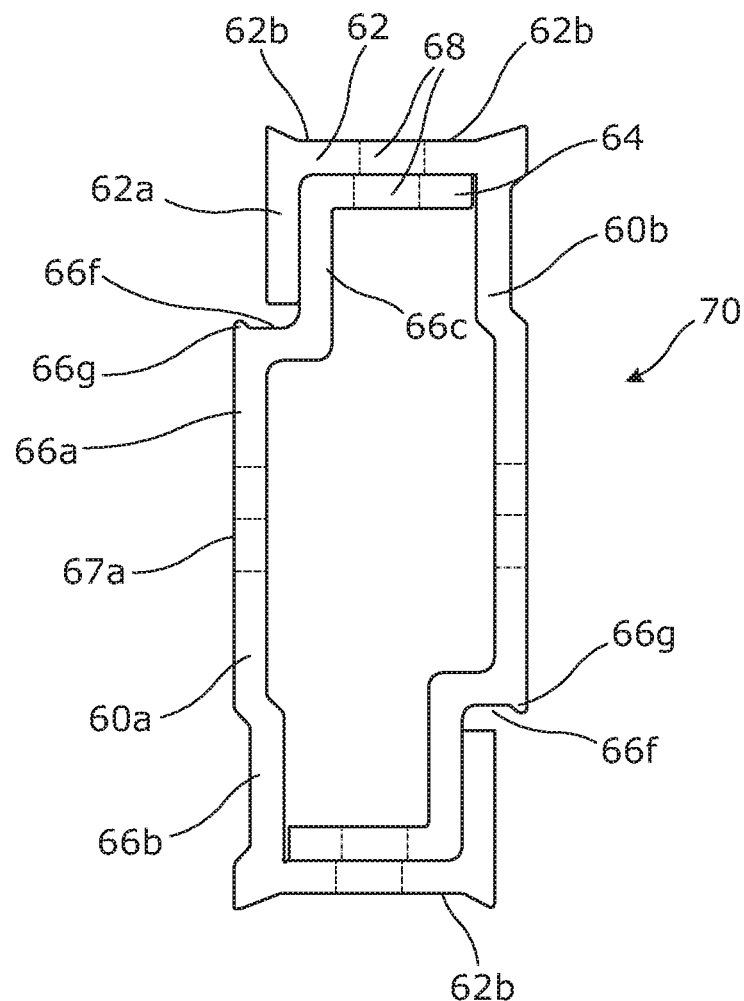

Referring now to FIGS. 6a to 6c, there is shown a further embodiment of a first panel support profile member 60 comprising a first arm 62, a second arm 64 and a bridging portion 66 intermediate the first and second arm 62, 64. Bridging portion 66 has a ribbed profile comprising a central portion 66a and side sections 66b and 66c respectively, positioned on either side of central portion 66a.

Referring specifically to FIG. 6c, there is shown an example of a fastening system 70 comprising two first panel support profile members 60. For clarity, first panel support profile members 60 hereinafter are referred to as the first and second panel support profile member 60a and 60b, wherein first and second panel support profile members 60a, 60b are configured to seat together such that the first panel support profile member 60a is inverted relative to the second panel support profile member 60b or vice versa. It is to be understood that references to the first panel support profile member 60a should where appropriate extend to the second panel support profile member 60b.

First arm 62, further comprises projecting member 62a and shaped surface 62b. Drainage openings 68 are positioned on the first and second arms 62, 64 such that the drainage openings 68 are substantially aligned when the first and second panel support profile members 60a and 60b seat together. Surface 62b of first arm 62 is shaped to assist with water management through fastening system 70 such that surface 62b promotes drainage of water or fluids either towards or away from the drainage openings depending on the orientation of the first and/or second panel support profile member. In this embodiment, surface 62b is curved.

When first and second panel support profile member 60a and 60b are seated together (as shown in FIG. 6c), curved surface 62b of second panel support profile member 60b functions to direct fluid towards drainage openings 68. Fluid then passes through the fastening system 70 via drainage openings 68. On the opposite side of fastening system 70, curved surface 62b of the first panel support profile member 60a functions to direct any water that creeps via capillary action from the drainage opening 68 towards the lowermost level of the curved surface 62b and subsequently away from fastening system 70.

Side sections 66b and 66c are offset from central portion 66a. Side section 66c is offset by a greater distance than side section 66b as indicated by section 66f. The distance side section 66c is offset from central portion 66a is approximately twice the width of projecting member 62a. In this embodiment, the distance side section 66c is offset from central portion 66a is approximately 0.25" (6.35 mm)±0.01" (0.25 mm) whilst the width of projecting member 62a is approximately 0.125" (3.18 mm)±0.01" (0.25 mm).

Section 66f is further provided with a protuberance 66g. In practice, protuberances 66g also function to direct fluid away from any surface to which fastening system 70 is attached, for example, a cladding panel or a structural substrate.

As for previous embodiments, fixing apertures 67a are positioned on bridging portion 66. In this embodiment, fixing apertures 67a are an elongate hexagonal open ended channel.

As for previous embodiments, in a further embodiment the width or thickness of the material used to form the first and/or second panel support profile member 60 is variable across the profile. For example, in one embodiment, the width of the projecting member 62a is approximately 0.10" (2.54 mm), whilst the width of central rib portion 66a is approximately 0.125" (3.18 mm) and the width of second arm 64 is approximately 0.08" (2.0 mm). In such an embodiment, the distance side section 66c is offset from central rib portion 66a is at least 0.1" (2.54 mm).

Figure 5A:
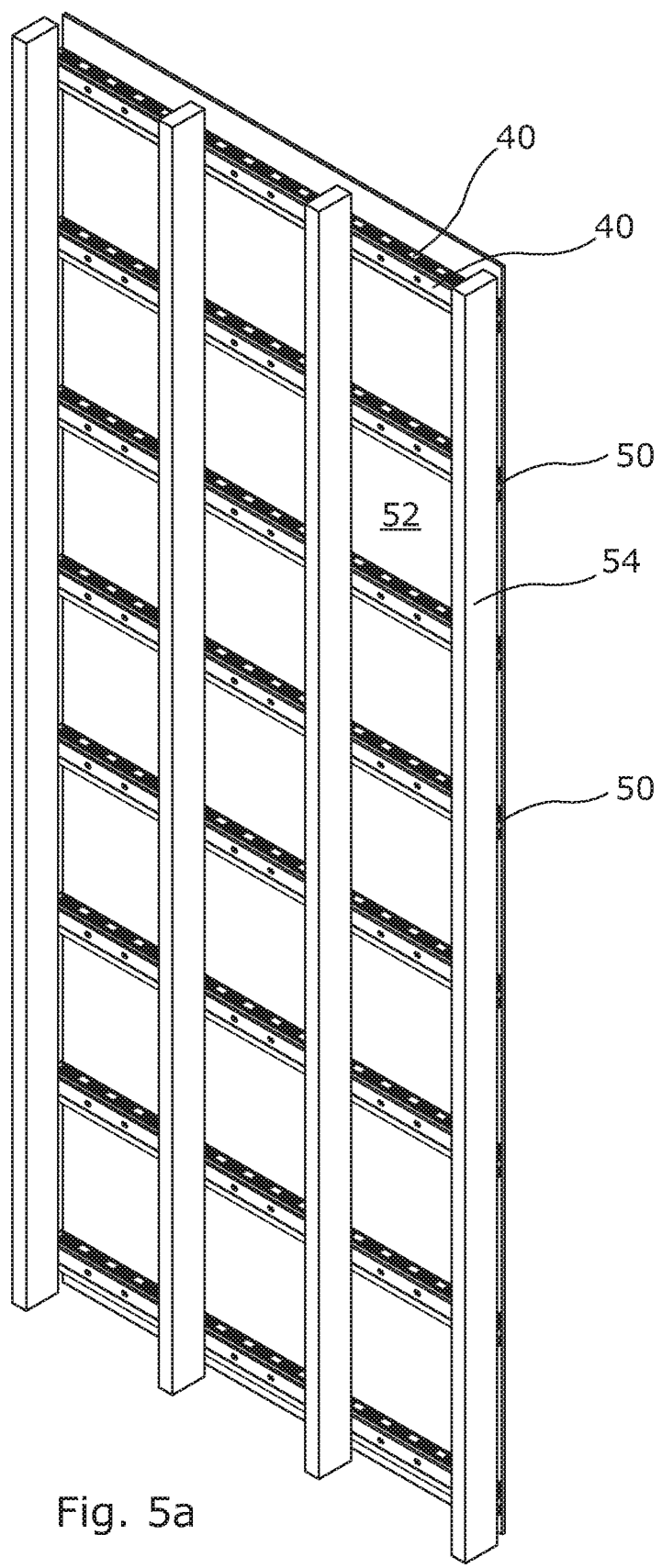
FIG. 5a is a perspective view of the rear face of a façade panel secured to a frame structure using the fastener system.
Figure 5B:
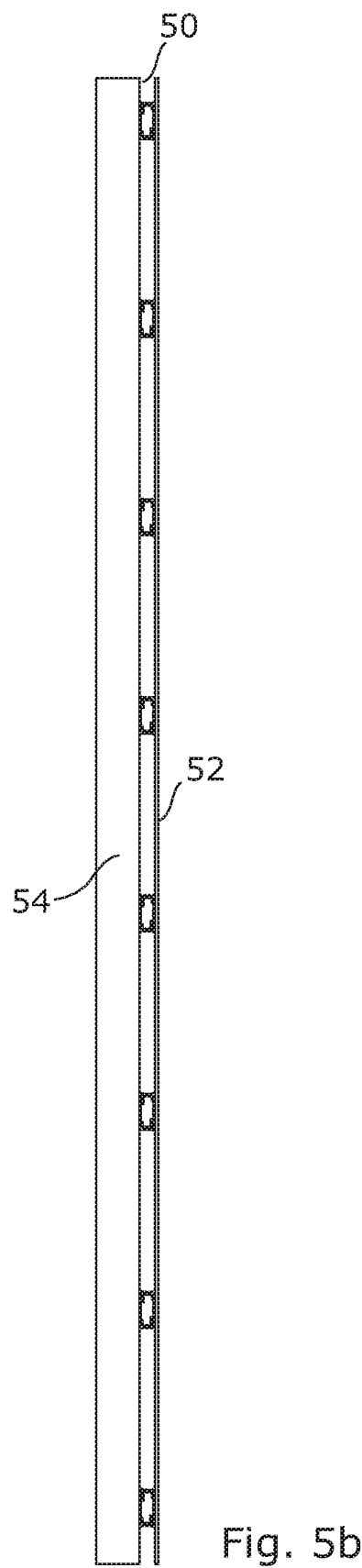
Figure 5C:
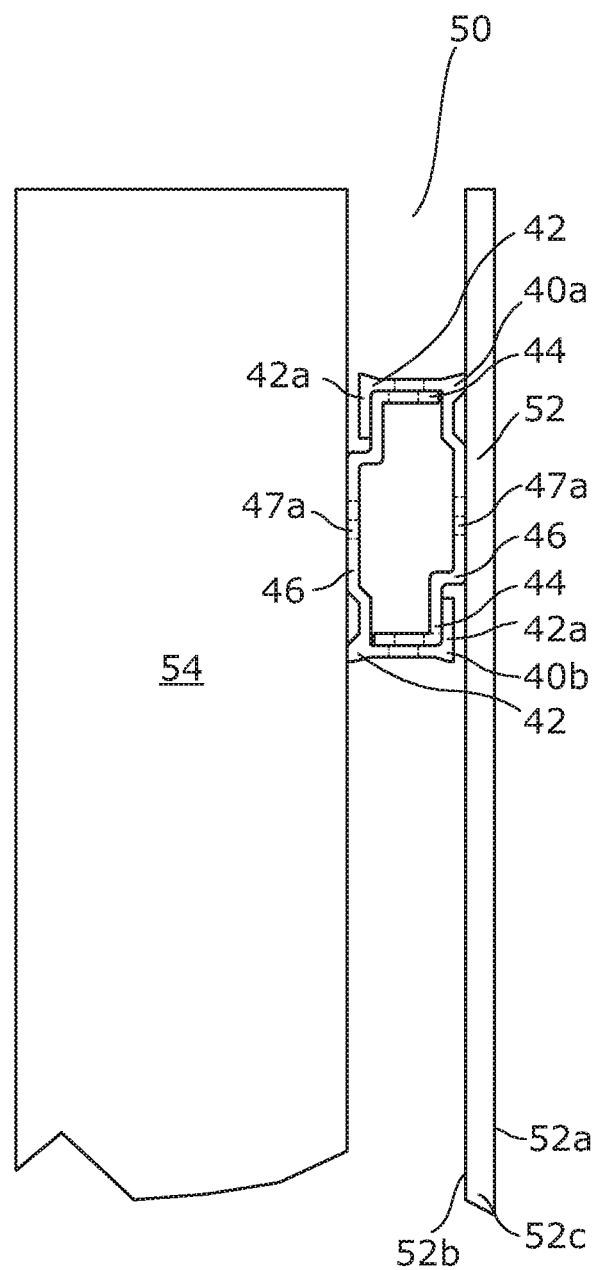
FIG. 5c is an enlarged side view of a portion of the façade panel, fastener system and frame structure of FIG. 5b.

Referring now to FIGS. 5a to 5c, there is shown an example of a fastening system 50 comprising two first panel support profile members. In the embodiment shown, two first panel support profile members 40 are used. Although not shown, it is possible to use any of the other embodiments of the first panel support profile members 10, 20, 30, 60 to seat together to form fastening system 50. It is also possible to use a combination of different embodiments of the first panel support profile members 10, 20, 30, 40, 60 to seat together to form fastening system 50.

For clarity, first panel support profile members 40 hereinafter are referred to as the first and second panel support profile member 40a and 40b. It is to be understood that references to the first panel support profile member 40a should where appropriate extend to the second panel support profile member 40b.

Referring specifically to FIGS. 5a and 5c, there is shown a cladding panel 52 attached to a structural substrate 54 using fastening system 50. Cladding panel 52 can comprise a building material comprising cementitious materials, gypsum, or other suitable inorganic building materials such as those containing cellulose, glass, steel or polymeric fibres. In the embodiment shown, cladding panel 52 comprises a fiber cement cladding panel comprising a front face 52a and a rear face 52b and an edge member 52c intermediate to and contiguous to the front face 52a and the rear face 52b. Structural substrate 54 typically comprises a building framework comprising timber or metal framing materials.

In the embodiment shown, a plurality of fastening systems 50 are used to attach cladding panel 52 to structural substrate 54. It is to be understood that the number of fastening systems and/or fastening configurations used to attach the cladding panel 52 to structural substrate 54 is variable and is dependent on both the size and shape of the cladding panel 52 and the desired wind load levels that the end user wishes to achieve.

For example, in the embodiment shown, a 4 ft.×8 ft. (121.9 cm×243.8 cm) cladding panel 52 having a thickness of 7/16" (1.1 cm) required 8 fastening systems to attach the cladding panel to the structural substrate and to achieve a minimum design loading of 54.6 psf. In this example, each fastening system was attached to the panel and the structural substrate using fasteners wherein the fasteners were spaced apart from each other by 12" (30.5 cm). The first fastener used to attach the first panel support profile member 40a to the rear face of the cladding panel 52b was placed at 6" (15.2 cm) from edge member 52c. The fasteners used were undercut anchors.

It is of course understood that different fasteners could require different fastening configurations to attach the first panel support profile members 10, 20, 30, 40, 60 to either a cladding panel 52 or structural substrate 54 and to achieve the same design load. It is also understood that in order to achieve alternative design load requirements that the number of fastening systems and or fastening configurations will also change as determined by the person skilled in the art and as tested in accordance with ASTM E330.

Referring specifically to FIG. 5c, there is shown an enlarged side view of one fastening system 50 of FIG. 5b, wherein a cladding panel 52 is attached to structural substrate 54 using fastening systems 50.

First panel support profile member 40a comprising a first arm 42, a second arm 44 and a bridging portion 46 intermediate the first and second arm 42, 44 is attached to the rear face 52b of the cladding panel 52 using fasteners via fixing apertures 47a. Similarly second panel support profile member 40b, also comprising a first arm 42, a second arm 44 and a bridging portion 46 intermediate the first and second arm 42, 44 is attached to the structural substrate 54 using fasteners via fixing apertures 47a.

First panel support profile member 40a is inverted relative to the second panel support profile member 40b such that the first and second panel support profile members 40a and 40b seat together. Second arm 44 seats within the 'u' shaped receiving channel defined by at least a portion of bridging portion 46, first arm 42 and projecting member 42a such that first arm 42 of the first panel support profile member 40a is seated adjacent to the second arm 44 of the second panel support profile member 40b and vice versa. Projecting member 42a of the first arm 42 is retained by the recess defined by at least a portion of bridging portion 46 and second arm 44. The weight of cladding panel 52 forces first and second panel support profile members 40a and 40b into position thereby attaching cladding panel 52 to structural substrate 54.

In practice, an end user firstly attaches the first and second panel support profile members 40a and 40b to each of the cladding panel 52 and the structural substrate 52 separately and then the first panel support profile member 40a and second panel support profile members 40b are secured together. The end user can use any suitable means to secure the first and second panel support profile members 40a, 40b together, as the shape of the first and second panel support profile members 40a, 40b allows the first and second panel support profile members 40a, 40b to interlock.

For example, the end user could hang the first and second panel support profile members 40a, 40b together whereby first panel support profile member 40a is moved into a position where it is raised out of alignment with second panel support profile member 40*b* such that second arm 44 of first panel support profile member 40*a* are positioned above the 'u'-shaped receiving channel defined by bridging portion 46, first arm 42 and projecting member 42*a* of the second panel support profile members 40*b*. Projecting member 42*a* of first panel support profile member 40*a* is also positioned above the recess defined by side section 46*b* and second arm 44 of the second panel support profile members 40*b*. The first panel support profile member 40*a* is then moved into alignment with second panel support profile member 40*b* such that second arm 44 of first panel support profile member 40*a* is seated within the 'u'-shaped receiving channel defined by bridging portion 46, first arm 42 and projecting member 42*a* of the second panel support profile members 40*b*; and projecting member 42*a* of first panel support profile member 40*a* is seated within the recess defined by side section 46*b* and second arm 44 of the second panel support profile members 40*b*.

Alternatively, the first and second panel support profile members 40*a*, 40*b* are slid into position whereby second arm 44 of first panel support profile member 40*a* is seated within the 'u'-shaped receiving channel defined by bridging portion 46, first arm 42 and projecting member 42*a* of the second panel support profile members 40*b*; and projecting member 42*a* of first panel support profile member 40*a* is seated within the recess defined by side section 46*b* and second arm 44 of the second panel support profile members 40*b*.

In either method, the weight of the cladding panel forces first and second panel support profile members 40*a*, 40*b* into the interlocking position. In this way, various embodiments of the present disclosure, advantageously provide a fastening system that is quick and easy to install for the end user.

In this embodiment, drainage openings 48 of both the first and second panel support profile members 40*a*, 40*b* are substantially aligned thereby facilitating drainage and ventilation through the fastening system thereby providing a rain screen system when the first and second panel support profile members 40*a*, 40*b* seat together. Drainage testing in accordance with ASTM E2273 using a 16"×16" (40.6 cm×40.6 cm) fastener configuration indicated that the drainage efficiency of the fastening system was 96.06%.

The foregoing description of the preferred embodiments of the present disclosure has shown, described and pointed out the fundamental novel features of the present disclosure. The various devices, methods, procedures, and techniques described above provide a number of ways to carry out the described embodiments and arrangements. Of course, it is to be understood that not necessarily all features, objectives or advantages described are required and/or achieved in accordance with any particular embodiment described herein. Also, although the present disclosure has been disclosed in the context of certain embodiments, arrangements and examples, it will be understood by those skilled in the art that the present disclosure extends beyond the specifically disclosed embodiments to other alternative embodiments, combinations, sub-combinations and/or uses and obvious modifications and equivalents thereof. Accordingly, the present disclosure is not intended to be limited by the specific disclosures of the embodiments herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Although making and using various embodiments are discussed in detail below, it should be appreciated that the description provides many inventive concepts that may be embodied in a wide variety of contexts. The specific aspects and embodiments discussed herein are merely illustrative of ways to make and use the systems and methods disclosed herein and do not limit the scope of the disclosure. The systems and methods described herein may be used for a fastening system for attaching a cladding panel to a structural substrate and are described herein with reference to this application. However, it will be appreciated that the disclosure is not limited to this particular field of use.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A fastening system suitable for attaching a cladding panel to a structural substrate comprising:
   a first and second panel support profile member, each of the first and second panel support profile members comprising a first arm, a second arm and a bridging portion intermediate the first arm and the second arm, wherein the bridging portion is configured to be attached to either the cladding panel or the structural substrate;
   wherein the first arm has a first thickness and the bridging portion has a second thickness, and the first thickness is greater than the second thickness;
   wherein the first arm of each of the first and second panel support profile members further comprises a projecting member;
   wherein a recess is defined by the second arm and at least a portion of the bridging portion of each of the first and second panel support profile members; and
   wherein the first and second panel support profile members seat together such that the first and second panel support profile members interlock whereby the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member, thereby interlocking the first and second panel support profile members together.

2. The fastening system as claimed in claim 1, wherein the first and second panel support profile members are configured to seat together such that the first panel support profile member is inverted relative to the second panel support profile member.

3. The fastening system as claimed in claim 1, wherein the first and second panel support profile members are configured to form a rain screen system.

4. The fastening system as claimed in claim 1, wherein the first and second panel support profile members further comprise one or more protuberances.

5. The fastening system as claimed in claim 1, wherein the first and second panel support profile members are identical panel support profile members.

6. The fastening system as claimed in claim 1, wherein the first and second arms of the first and second panel support profile members further comprises one or more drainage channels.

7. The fastening system as claimed in claim 6, wherein the first and second arms of the first and second panel support profile members each comprise at least one drainage opening, and wherein the one or more drainage channels are in communication with the at least one drainage opening.

8. The fastening system as claimed in claim 6, wherein the one or more drainage channels are in the form of a recess or indentation.

9. The fastening system as claimed in claim 8, wherein the one or more drainage channels are located in the first arm of the first and second panel support profile members.

10. The fastening system as claimed in claim 8, wherein the one or more drainage channels are located in the first and second arms of the first and second panel support profile members.

11. The fastening system as claimed in claim 1, wherein the bridging portion of the first and second panel support profile members are provided with one or more fixing apertures.

12. The fastening system as claimed in claim 11, wherein the fixing apertures are in the form of open ended channels which are shaped to allow placement of a fixing element.

13. The fastening system as claimed in claim 11, wherein the fixing apertures are positioned in the bridging portion of the first and second panel support profile members to facilitate the use of angled fasteners.

14. The fastening system as claimed in claim 13, wherein the fixing apertures are set at an angle within a range of approximately 35°±1° to approximately 55°±1°.

15. The fastening system as claimed in claim 1, wherein the first and second arms of the first and second panel support profile members each comprise at least one drainage opening.

16. The fastening system as claimed in claim 15, wherein the drainage openings of the first and second arms are positioned on the first and second arms such that the drainage openings of the first and second arms are substantially aligned when the first and second panel support profile members seat together.

17. The fastening system as claimed in claim 16, wherein the drainage openings are aligned along at least 50% of the area of the drainage openings.

18. The fastening system as claimed in claim 15, wherein at least a portion of the surface of the first arm is a shaped surface to facilitate water management whereby the shape of the surface is configured to promote drainage of water either towards or away from the drainage openings depending on the orientation of at least one of the first or second panel support profile member.

19. The fastening system as claimed in claim 18, wherein the shaped surface of the first arm is a sloped, curved or arcuate surface.

20. The fastening system as claimed in claim 18, wherein the shaped surface of the first arm is coated with a hydrophobic coating.

21. A cladding system comprising:
   at least one cladding panel comprising a front face and a rear face and an edge member intermediate to and contiguous to the front face and the rear face;
   a structural substrate; and
   at least one fastening system as claimed in claim 1;
   wherein the bridging portion of the first panel support profile member is configured to be attached to the rear face of the cladding panel and the bridging portion of the second panel support profile member is configured to be attached to the structural substrate;

wherein the first panel support profile member is attached to the rear face of the cladding panel and the second panel support profile member is attached to the structural substrate; and wherein the first and second panel support profile member seat together such that the first and second panel support profile members interlock whereby the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member; thereby interlocking the first and second panel support profile members together and attaching the cladding panel to the structural substrate.

22. The cladding system as claimed in claim 21, wherein the cladding panel comprises a building material selected from the group consisting of cementitious materials, gypsum, and inorganic building materials containing cellulose, glass, steel or polymeric fibres.

23. The cladding system as claimed in claim 21, wherein the cladding panel comprises a fiber cement cladding panel.

24. A method of installing a cladding system on a structural substrate comprising the steps of:
(a) providing at least one cladding panel comprising a front face and a rear face and an edge member intermediate to and contiguous to the front face and the rear face;
(b) providing the fastening system as claimed in claim 1;
(c) attaching the first panel support profile member to the rear face of the cladding panel;
(d) attaching the second panel support profile member to the structural substrate; and
(e) seating the first and second panel support profile members together such that the first and second panel support profile members interlock whereby the projecting member of the first arm of the first panel support profile member is retained within the recess defined by the second arm and the at least a portion of the bridging portion intermediate the first and second arm of the second panel support profile member; and the projecting member of the first arm of the second panel support profile member is retained within the recess defined by the second arm and the at least a portion of the bridging portion intermediate the first and second arm of the first panel support profile member; thereby interlocking the first and second panel support profile members together and attaching the cladding panel to the structural substrate.

25. The method as claimed in claim 24, wherein steps (c) and (d) are carried out in reverse order, wherein step (d) attaching the second panel support profile member to the structural substrate is carried out in advance of step (c) attaching the first panel support profile member to the rear face of the cladding panel.

26. The method as claimed in claim 24, wherein the method further comprises the step of installing at least one of (i) weather resistive barrier, (ii) weather resistant tape or (iii) flashings to the structural substrate in advance or while one of steps (a) to (e) are carried out.

* * * * *